US006563833B1

United States Patent
Wool et al.

(10) Patent No.: US 6,563,833 B1
(45) Date of Patent: May 13, 2003

(54) COMBINATORIAL DESIGN METHOD AND APPARATUS FOR MULTI-RING NETWORKS WITH COMBINED ROUTING AND FLOW CONTROL

(75) Inventors: Avishai Wool, Livingston, NJ (US); Bulent Yener, New York City, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/225,991

(22) Filed: Jan. 5, 1999

(51) Int. Cl.[7] .............................................. H04L 12/28
(52) U.S. Cl. ...................................... 370/404; 370/452
(58) Field of Search ................................. 370/230, 235, 370/258, 401, 402, 403, 404, 405, 406, 424, 452

(56) References Cited

U.S. PATENT DOCUMENTS

| | | | | |
|---|---|---|---|---|
| 4,577,313 A | * | 3/1986 | Sy | 370/88 |
| 5,440,540 A | * | 8/1995 | Kremer | 370/16.1 |
| 5,504,747 A | * | 4/1996 | Sweazey | 370/403 |
| 5,550,805 A | * | 8/1996 | Takatori et al. | 370/222 |
| 5,590,124 A | * | 12/1996 | Robins | 370/258 |
| 2001/0012298 A1 | * | 8/2001 | Harshavardhana | |

OTHER PUBLICATIONS

Cidon & Y. Ofek, MetaRing—A Full Duplex Ring with Fairness and Spatial Reuse, IEEE Trans. Communications, vol. 41, 110–20 (Jan. 1993).
357–61 (CRC Press 1996).
C.J. Colbourn & J.H. Dinitz, The CRC Handbook of Combinatorial Designs.
Chung–Sheng Li et al., "Time–Driven Priority" Flow Control for Real–Time Heterogeneous Internetworking, IEEE 189–97 (1996).
B. Yener et al., Combinatorial Design of Congestion–Free Networks, IEEE/ACM Trans. on Networking, vol. 5, No. 6, 989–1000 (Dec. 1997).

* cited by examiner

*Primary Examiner*—Wellington Chin
*Assistant Examiner*—Brenda Pham
(74) *Attorney, Agent, or Firm*—Ryan, Mason & Lewis, LLP (57) ABSTRACT

A method and apparatus are disclosed for designing multi-ring networks based on generalized quadrangles of combinatorial design theory, together with a scaling algorithm for realizing networks of arbitrary size. Multi-ring networks based on generalized quadrangles ensures that the path between any two nodes is either confined to a single ring, or traverses exactly two rings (passing through a single bridge node), referred to herein as the "one-bridge property." The one-bridge property allows the construction of networks with small rings and low degree, while also permitting efficient congestion-free flow control protocols. Routing, access and flow control protocols are provided for the multi-ring network that capitalize on the combinatorial properties of the disclosed multi-ring networks. A "self-routing" routing protocol is disclosed wherein a source node does not need to know how to route a packet to a destination node that is not a neighbor. The access control mechanism disclosed herein utilizes a quota counter, k, and allows each node to transmit up to the predefined quota of k packets on each ring, $R_i$, that the node belongs to, during any cycle. A set of flow control buffers, consisting of a local queue, $LQ_i$, a remote queue, $RQ_{ij}(x)$, and a buffer queue, $BQ_{ij}$, and a flow control quota matrix, $Q^i$, are utilized to implement a flow control mechanism. The routing, flow and access control protocols, together with the disclosed network architecture, ensure that (i) no loss due to congestion occurs inside a network, under arbitrary traffic patterns; (ii) all the packets reach their destinations within a bounded time; and (iii) the bandwidth is allocated fairly and no host is starved.

17 Claims, 7 Drawing Sheets

RING ALLOCATION TABLE

| RING NUMBER | INCLUDED NODES |
|---|---|
| 1 | 1, 4, 5 |
| 2 | 1, 8, 9 |
| 3 | 1, 12, 13 |
| 4 | 2, 4, 6 |
| 5 | 2, 8, 10 |
| 6 | 2, 12, 14 |
| 7 | 3, 4, 7 |
| 8 | 3, 8, 11 |
| 9 | 3, 12, 15 |
| 10 | 5, 10, 15 |
| 11 | 5, 11, 14 |
| 12 | 6, 9, 15 |
| 13 | 6, 11, 13 |
| 14 | 7, 9, 14 |
| 15 | 7, 10, 13 |

PARAMETERS OF GENERALIZED QUADRANGLE CONSTRUCTIONS

| NODES (N) | RINGS (M) | DEGREE (D) | RING SIZE (n) | NEIGHBORS |
|---|---|---|---|---|
| 15 | 15 | 3 | 3 | 6 |
| 27 | 45 | 5 | 3 | 10 |
| 40 | 40 | 4 | 4 | 12 |
| 45 | 27 | 3 | 5 | 12 |
| 64 | 96 | 6 | 4 | 18 |
| 85 | 85 | 5 | 5 | 20 |
| 96 | 64 | 4 | 6 | 20 |
| 112 | 280 | 10 | 4 | 30 |
| 125 | 175 | 7 | 5 | 28 |
| 156 | 156 | 6 | 6 | 30 |
| 165 | 297 | 9 | 5 | 36 |
| 175 | 125 | 5 | 7 | 30 |
| 280 | 112 | 4 | 10 | 36 |
| 297 | 165 | 5 | 9 | 40 |
| 325 | 1105 | 17 | 5 | 68 |
| 343 | 441 | 9 | 7 | 54 |
| 400 | 400 | 8 | 8 | 56 |

RING-NEIGHBOR DATABASE

| RING NEIGHBOR | PHYSICAL ADDRESS | VIRTUAL IDENTIFIER (VID) |
|---|---|---|
| $N_4$ | $V_4$ | $VID_4$ |
| $N_5$ | $V_5$ | $VID_5$ |
| $N_8$ | $V_8$ | $VID_8$ |
| $N_9$ | $V_9$ | $VID_9$ |
| $N_{12}$ | $V_{12}$ | $VID_{12}$ |
| $N_{13}$ | $V_{13}$ | $VID_{13}$ |

FIG. 5

| NODE | DELAY | SLOTS SEEN | |
|---|---|---|---|
| o |  | 1 2 3 4 5 6 7 8 9 | 1 2 3 4 5 6 7 8 9 |
| v | $\Delta(o, v) = 2$ | 8 9 1 2 3 4 5 6 7 | 8 9 1 2 3 4 5 6 7 |
| u | $\Delta(v, u) = 3$ | 5 6 7 8 9 1 2 3 4 | 5 6 7 8 9 1 2 3 4 |

COMBINATORIAL DESIGN METHOD AND APPARATUS FOR MULTI-RING NETWORKS WITH COMBINED ROUTING AND FLOW CONTROL

FIELD OF THE INVENTION

The present invention relates generally to a system for designing multi-ring networks, and more particularly, to a system for designing multi-ring networks based on a combinatorial design theory.

BACKGROUND OF THE INVENTION

The ever-increasing growth of data traffic and the associated bandwidth requires careful design and planning of the infrastructures of next-generation networks. The underlying network infrastructure directly determines how well the routing, flow and access control protocols perform. Thus, the design of the network infrastructure, as well as the routing and network control protocols, should be addressed as a combined problem.

The integrated design approach for network infrastructure and network control protocols should produce a network that exhibits low packet loss as well as throughput scalability. Current network designs do not ensure both of these properties simultaneously. Networks with a simple network topology, such as a bus or a ring architecture, are not throughput scalable. Likewise, networks with an Internet-like topology are throughput scalable, but they typically do not exhibit low packet loss.

A popular building block for network design is a ring network topology, such as those used in local area network (LAN) environments. A multi-ring topology is the backbone topology of choice in the Synchronous Optical Network (SONET) standard and in telecommunication infrastructure networks. Traditional approaches to the design of multi-ring networks either face computationally hard problems, or use heuristic methods with approximate answers. A multi-ring network design should exhibit small rings, thereby providing low propagation delay, and low degree (the number of rings a node belongs to). Typically, there is a trade-off between the ring size and the node degree.

Well-known combinatorial design theory (CDT) principles were first applied to multi-ring network designs in B. Yener et al., "Topological Design of Loss-Free Switch-Based LANs," IEEE INFO-COM '94, (1994) and B. Yener et al., "Combinatorial Design of Congestion-Free Networks," Transactions on Networking, Vol. 5, No. 6, 989–1000 (December, 1997), collectively, referred to herein as the "BIBD Systems." The BIBD Systems use balanced incomplete block designs (BIBDs) to obtain congestion-free multi-ring networks with scalable throughput. The BIBD Systems include networks in which the maximum route length and the maximum degree are both bounded by a value on the order of the square root of N, in an N-node network. These bounds are similar to those of earlier approaches to multi-ring network design, such as chordal rings, or ring-connected rings, with the additional property of congestion-free routing.

A need exists for a method and apparatus for designing multi-ring networks that are throughput scalable, so that new nodes or links can be added without decreasing the throughput. In addition, a further need exists for multi-ring networks that provide congestion-free routing with improved bounds on the maximum route length and the node degree.

SUMMARY OF THE INVENTION

Generally, a method and apparatus are disclosed for designing multi-ring networks based on combinatorial design theory. According to one aspect of the invention, multi-ring networks are constructed using generalized quadrangles of combinatorial design theory, together with a scaling algorithm for realizing networks of arbitrary size. Initially, generalized quadrangles are used to obtain a network of multiple rings where the path between any two nodes is either confined to a single ring, or traverses exactly two rings (passing through a single bridge node), referred to herein as the "one-bridge property."

The one-bridge property allows the construction of networks with small rings (giving low propagation delay) and low degree, while also permitting efficient congestion-free flow control protocols. Multi-ring networks designed using generalized quadrangles have additional symmetry properties that are useful for routing protocols. If a first node needs to send a packet to a second node, and they are not neighbors, then the first node can select any of the rings that the first node is a member of, and place the packet on this ring. On each of the first node's rings, there exists a bridge node that also belongs to one of the second node's rings and the bridge node is capable of bridging the packet to its destination. Thus, using a generalized quadrangle as the underlying design of the network provides a great deal of flexibility in a routing protocol.

According to further aspects of the invention, routing, access and flow control protocols are provided for the multi-ring network that capitalize on the combinatorial properties of the disclosed multi-ring networks. A "self-routing" routing protocol is disclosed wherein a source node does not need to know how to route a packet to a destination node that is not a neighbor. The packet can be placed on any arbitrary ring, and the packet will arrive at the destination node. The access control mechanism disclosed herein utilizes a quota counter, k, and allows each node to transmit up to the predefined quota of k packets on each ring, $R_i$, that the node belongs to, during any cycle. A node can send packets as long as the quota counter is positive, and the counter is decremented for every packet sent.

According to a further aspect of the invention, a set of flow control buffers, consisting of a local queue, $LQ_i$, a remote queue, $RQ_{ij}(x)$, and a buffer queue, $BQ_{ij}$, and a flow control quota matrix, $Q^i$, are utilized to implement a flow control mechanism. The access control technique ensures that local traffic is congestion free, since packets are not dropped while they are on a single ring. In addition, the one-bridge property of the present invention ensures that a remote packet needs to cross only one bridge, so only a single bridge buffer may overflow along the path of a packet. Furthermore, the bridge node shares a ring with the source node. Thus, feedback is provided to all the sources on a ring, in the form of a circulating quota-matrix, $Q^i$. The quota-matrix, $Q^i$, allows the source nodes to slow down transmissions when the bridge buffers are close to capacity.

Flow control is implemented using a system of quotas that govern the service rates for the different flow queues. The quotas are in units of packets that a node can transmit during a cycle rotation time, D. Since local traffic does not pose a buffer overflow problem, a specific quota is not imposed on the local queue, LQ (other than the general access control quota, k). A node is allowed to transmit at most $r_u^{ij}(x)$ packets per cycle out of each remote buffer $RQ_{ij}(x)$.

The $r_u^{ij}(x)$ quotas are modified adaptively by a combined routing, flow and access process. Generally, as a buffer queue, $BQ_{ij}$, at a bridge node, x, is filled, the bridge node adaptively reduces the $r_u^{ij}(x)$ quotas of all the other nodes on a ring, $R_i$. The buffer queues, $BQ_{ij}$, are managed by circulating a quota matrix, $Q^i$, on each ring, $R_i$. The quota matrix, $Q^i$, contains entries indicating the total number of packets that each node is willing to bridge from rings $R_i$ to $R_j$.

The routing, flow and access control protocols, together with the disclosed network architecture, ensure that (i) no loss due to congestion occurs inside a network, under arbitrary traffic patterns; (ii) all the packets reach their destinations within a bounded time; and (iii) the bandwidth is allocated fairly and no host is starved. In addition, the disclosed multi-ring networks guarantee convergence and are throughput scalable, so that adding new nodes or links will not decrease the throughput.

The multi-ring networks of the present invention exhibit a maximum route length on the order of $N^{1/3}$ (where N is the number of nodes) and have a degree (number of ports per node) on the order of $N^{1/3}$ as well. In addition, the multi-ring networks require a total number of links on the order of $N^{4/3}$, which is less than the approximately $N^{3/2}$ links in the BIBD Systems discussed above and only slightly higher than the minimal $N-1$ links required for connectivity.

A more complete understanding of the present invention, as well as further features and advantages of the present invention, will be obtained by reference to the following detailed description and drawings.

DETAILED DESCRIPTION

Figure 1:
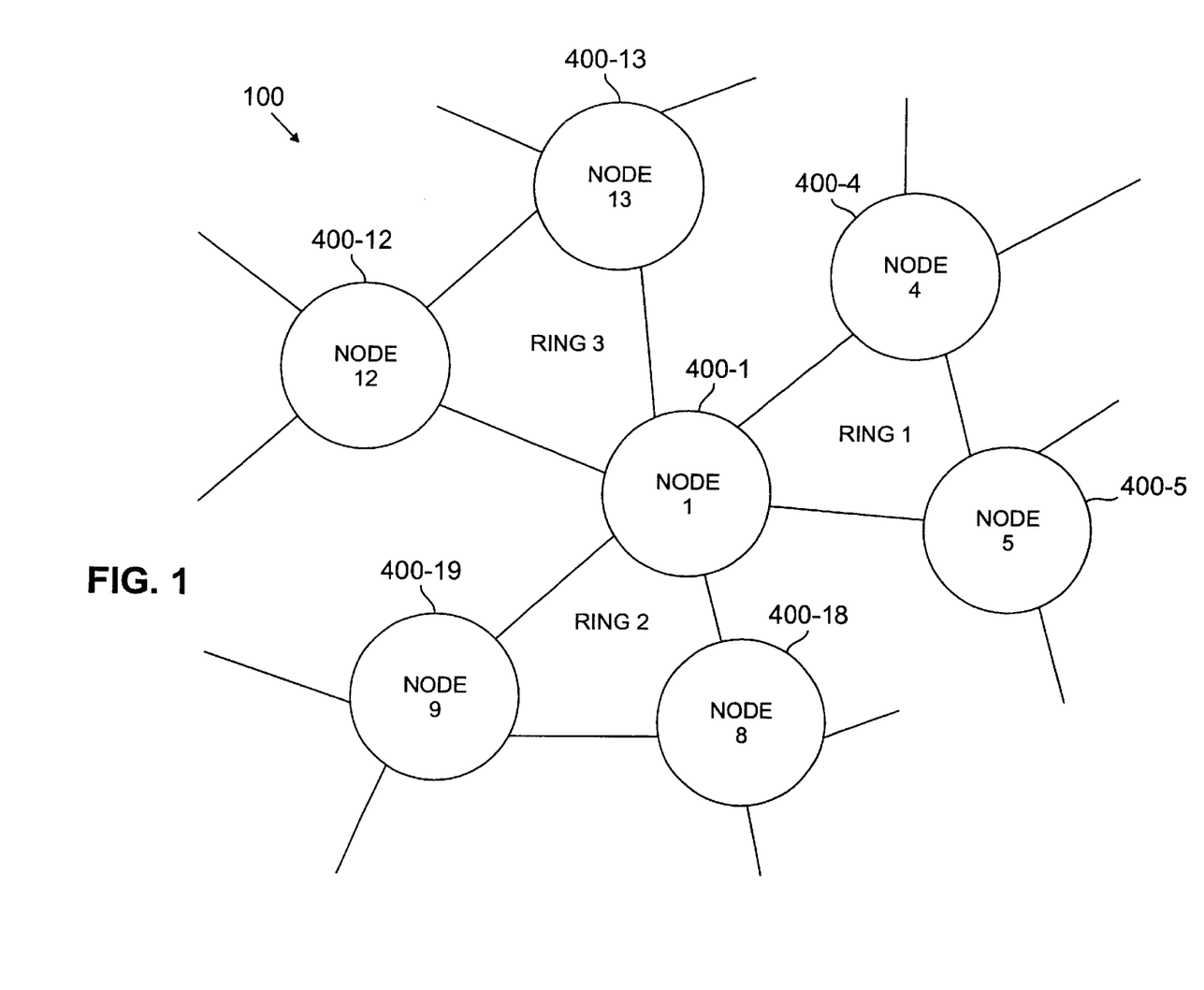
FIG. 1 is a schematic block diagram illustrating a portion of a multi-ring network in accordance with the present invention.

FIG. 1 illustrates a portion of a multi-ring network 100 in accordance with the present invention. The multi-ring network 100 consists of a plurality of rings, such as rings 1 through 3, each containing a plurality of nodes, such as the nodes 400-1, 400-4, 400-5, 400-8, 400-9, 400-12 and 400-13. A representative node 400-N is discussed further below in conjunction with FIG. 4. The nodes are arranged into multiple rings to form the multi-ring network 100. According to one feature of the present invention, multi-ring networks 100 are constructed using generalized quadrangles of combinatorial design theory, together with a scaling algorithm for realizing networks of arbitrary size. Initially, generalized quadrangles are used to obtain a network of multiple rings where the path between any two nodes is either confined to a single ring, or traverses exactly two rings (passing through a single bridge node), referred to herein as the "one-bridge property." The multi-ring networks 100 disclosed herein provide a high level of path redundancy. In addition, the combinatorial properties of the multi-ring networks 100 translate directly into traffic independent bounds on the maximum route length and on the survivability of the network.

According to further features of the present invention, routing, flow and access control protocols are provided for the multi-ring network 100 that capitalize on the combinatorial properties of the disclosed multi-ring networks 100. The routing, flow and access control protocols, together with the disclosed network architecture, ensure that (i) no loss due to congestion occurs inside a network, under arbitrary traffic patterns; (ii) all the packets reach their destinations within a bounded time; and (iii) the bandwidth is allocated fairly and no host is starved. In addition, the disclosed multi-ring networks guarantee convergence and are throughput scalable, so that adding new nodes or links will not decrease the throughput.

Combinatorial Construction of Multi-Ring Networks

As previously indicated, the multi-ring networks 100 disclosed herein obey the one-bridge property. The one-bridge property requires that a packet crosses at most one ring-to-ring bridge along its path from any node to any other node in the network 100. The one-bridge property allows the construction of networks 100 with small rings (giving low propagation delay) and low degree, while also permitting efficient congestion-free flow control protocols.

If $R=R_1, \ldots, R_M$ denotes the rings of a multi-ring network 100, then R is said to satisfy the one-bridge property, if for every two nodes x and y one of the following conditions holds:

1. there exists a ring, $R_i$, such that $x \in R_i \ni y$ (x and y are said to be neighbors on ring, $R_i$); or
2. there exists two rings, $R_i$, $R_j$, and a node z, such that $x \in R_i \ni z \in R_j \ni y$ (z is said to be the "bridge node," or the "bridge").

Block-designs, such as those in the BIBD Systems discussed above, satisfy the one-bridge property in a trivial way, namely, every two nodes are neighbors on some ring. Thus, condition 1 of the one-bridge property conditions always holds. The present invention, however, includes designs in which many of the node pairs are not neighbors on any ring.

Generalized quadrangles are a class of combinatorial designs that satisfy the one-bridge property. A survey of these combinatorial objects can be found in C. J. Colbourn and J. H. Dinitz, *The CRC Handbook of Combinatorial Designs*, Ch. IV.21 (CRC Press, 1996), incorporated by reference herein. A more comprehensive discussion of generalized quadrangles can be found in S. E. Payne and J. A. Thas, "Finite Generalized Quadrangles," Research Notes in Mathematics 110 (Pitman, London 1984), incorporated by reference herein.

Generally, a finite generalized quadrangle is a collection, C, of sets (rings) over a universe, U, of nodes satisfying the following:

1. each node belongs to (t+1) rings, and two distinct nodes belong to at most one ring together;
2. each ring contains (s+1) nodes, and two distinct rings have at most one node in common;
3. if $x \in U$ is a node and $R \in C$ is a ring such that $x \notin R$, then there exists a unique $y \in U$ and $S \in C$ such that $x \in S \ni y \in R$.

A generalized quadrangle with parameters s, t is said to be of order (s, t).

As discussed further below, generalized quadrangles have additional symmetry properties that are useful for routing protocols. If x and y are nodes in a generalized quadrangle of order (s, t) and x and y are not neighbors, then there exist (t+1) distinct pairs of rings, $R_i^x$, $R_i^y$, such that $x \in R_i^x$, $y \in R_i^y$, and $|R_i^x \cap R_i^y|=1, \ldots, t+1$. Thus, if node x needs to send a packet to node y, and they are not neighbors, then node x can select any of the t+1 rings it is a member of; and place the packet on this ring. On each of node x's rings, there exists a bridge that also belongs to one of y's rings and is capable of bridging the packet to its destination. Thus, using a generalized quadrangle as the underlying design of the network provides a great deal of flexibility in a routing protocol. As discussed below, a "self-routing" routing protocol is disclosed wherein a source node, x, does not need to know how to route a packet to a destination node, y, that is not a neighbor. The packet can be placed on any arbitrary ring, and it will arrive at the destination node, y.

A generalized quadrangle of order (s, t) has a total of N equal to (s+1)(st+1) nodes; a total of M equal to (t+1)(st+1) rings; rings of size n=(s+1); node degree of d=(t+1) and each node has (ts+s) nodes as neighbors. Thus, for a generalized quadrangle, $n^2d$ is approximately equal to N. Thus, balancing the constraints on n and d, n and d can both be on the order of $N^{1/3}$. It is noted that infinite families of such construction are known to exist. For example, there exists a generalized quadrangle of order (q, q) (referred to as the W(q) design) for every q, which is a power of a prime number.

Figure 2:
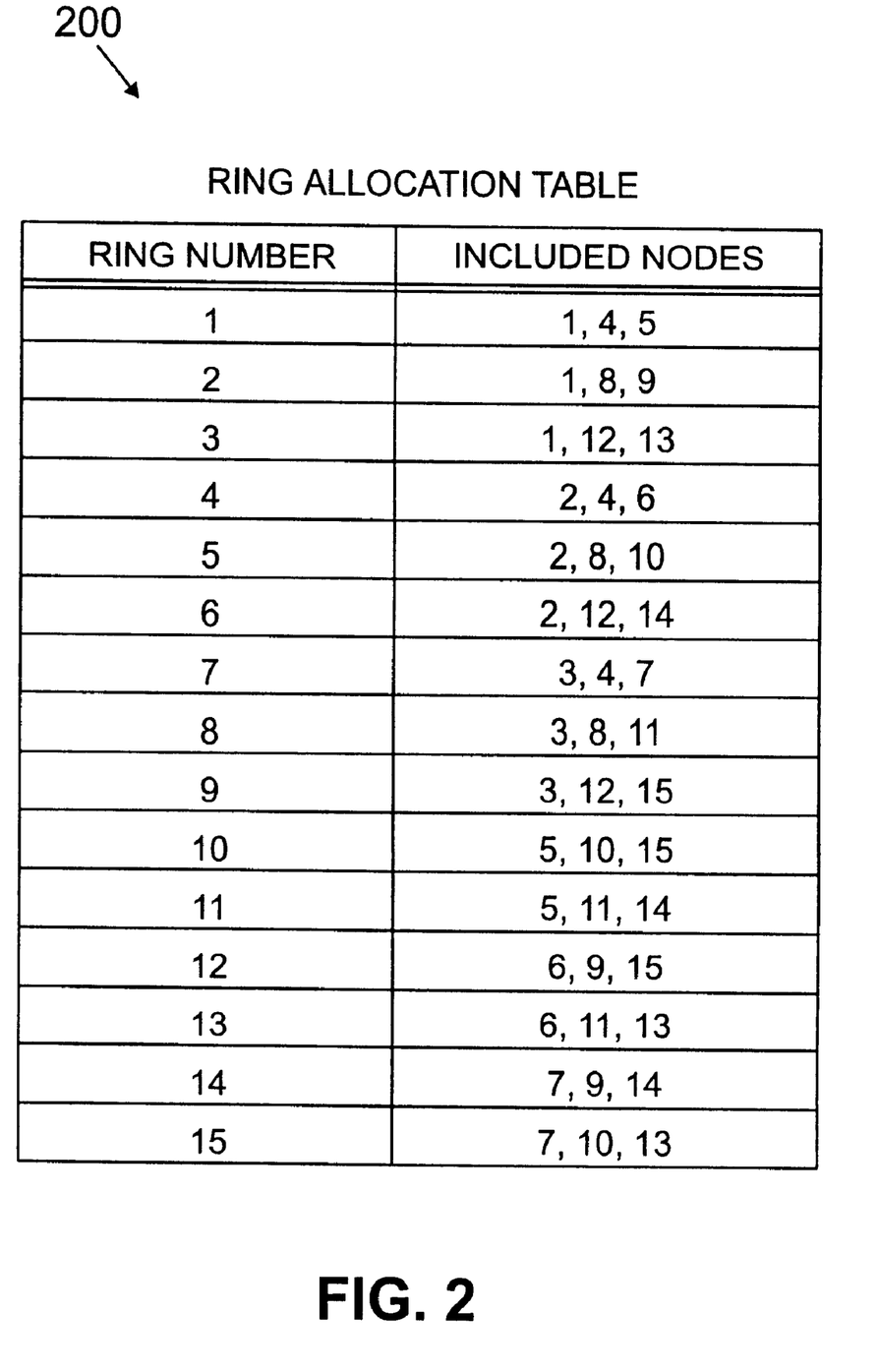
FIG. 2 is a ring allocation table, indicating how a plurality of nodes are interconnected to form the multi-ring networks of FIG. 1.
Figure 3:
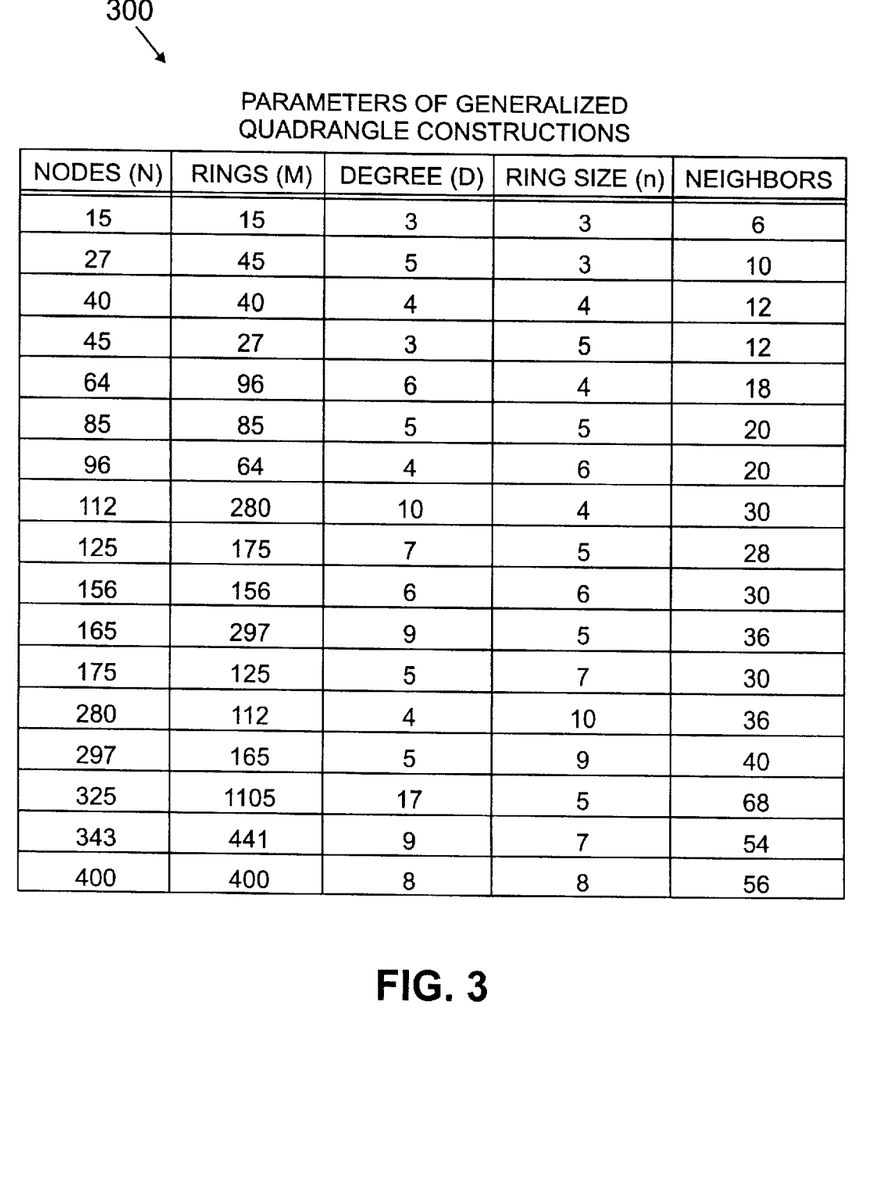
FIG. 3 is a table illustrating a number of parameters for multi-ring networks of various sizes designed in accordance with the present invention.

FIG. 2 lists the complete W(2) design, which is the smallest non-trivial generalized quadrangle and has an order of (2, 2). FIG. 3 lists the important parameters of the known generalized quadrangle constructions with up to 400 nodes. The details of each construction are discussed in C. J. Colbourn and J. H. Dinitz, *The CRC Handbook of Combinatorial Designs*, Ch. IV.21 (CRC Press, 1996) and .E. Payne and J. A. Thas, "Finite Generalized Quadrangles," Research Notes in Mathematics 110 (Pitman, London 1984), incorporated by reference above.

Thus, a multi-ring network 100 can be designed by selecting a ring size and degree pair, for which a generalized quadrangle exists, such as any of the rows in FIG. 3, determining the number of nodes supported, and obtaining the node/ring allocation specified by the generalized quadrangle to determine the interconnectivity of the various nodes.

Figure 4:
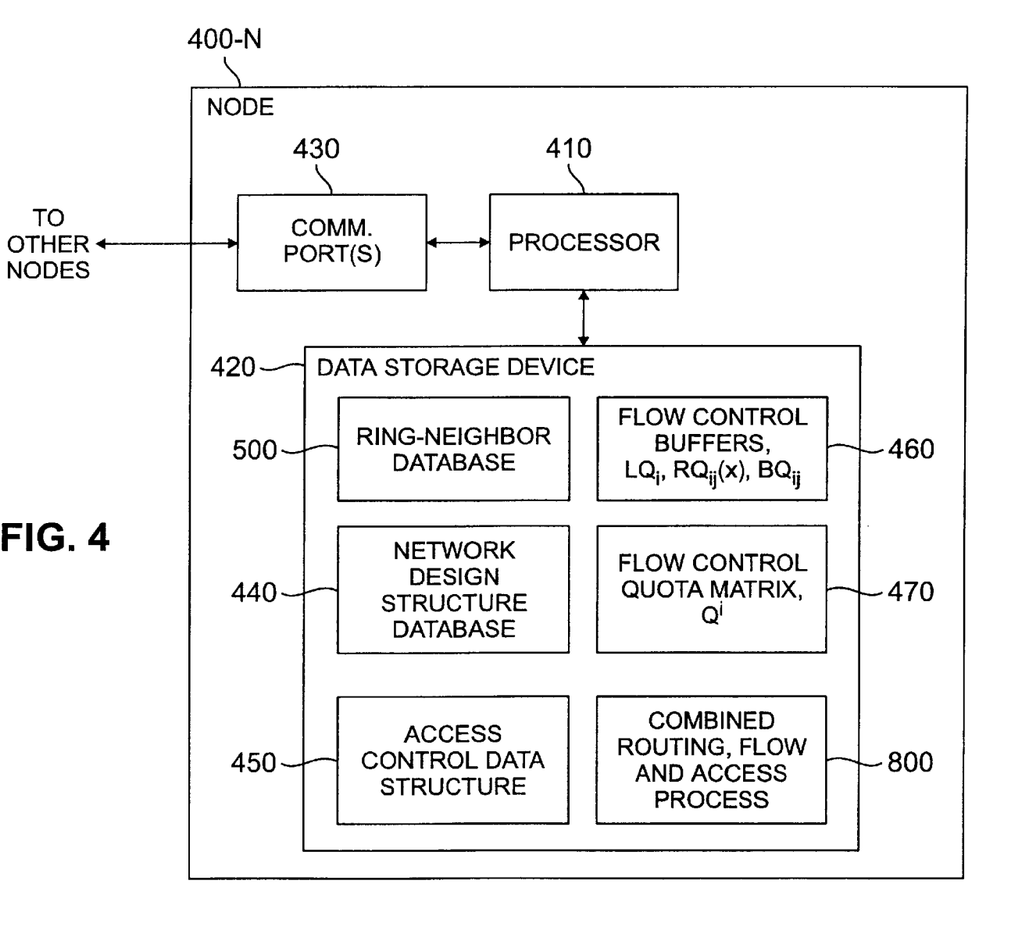
FIG. 4 is a schematic block diagram of an illustrative node of FIG. 1.

FIG. 4 is a block diagram showing the architecture of an illustrative node 400-N. The node 400-N may be a conventional switch, router, or another machine having some switching capability, as modified herein to execute the functions and operations of the present invention. The node 400-N preferably includes a processor 410 and related memory, such as a data storage device 420. The processor 410 may be embodied as a single processor, or a number of processors operating in parallel. The data storage device 420 and/or a read only memory (ROM) are operable to store one or more instructions, which the processor 410 is operable to retrieve, interpret and execute. The communications port(s) 430 connect the node 400-N to other nodes 400 in the multi-ring network 100 as discussed above to satisfy the one-bridge property.

The data storage device 420 preferably records a number of parameters and other variables, discussed below, to implement the routing, flow and access control protocols of the present invention. For example, as discussed below in a section entitled VIRTUAL SLOTTED RING OPERATION, the data storage device 420 includes a ring-neighbor database 500, shown in FIG. 5, that includes information about the ring-neighbors of a node on every ring that the node belongs to and a network design structure database 440, indicating which nodes belong to each ring, similar to the ring allocation table 200 shown in FIG. 2. In addition, as discussed below in a section entitled ACCESS CONTROL, the data storage device 420 includes an access control data structure 450 that contains a number of variables that prevent a node from transmitting more than a predefined number of packets on a particular ring, in a given time interval. In addition, as discussed below in a section entitled FLOW CONTROL, the data storage device 420 includes a set of flow control buffers 460, consisting of a local queue, $LQ^i$, a remote queue, $RQ_{ij}(x)$, and a buffer queue, $BQ_{ij}$, and a flow control quota matrix, $Q^i$.470. Finally, the data storage device 420 includes a combined routing, flow and access control process 800, shown in FIG. 8, for the multi-ring network 100 that capitalizes on the combinatorial properties and implements the techniques discussed in the ACCESS and FLOW CONTROL sections.

Virtual Slotted Ring Operation

In one implementation, a time-driven priority technique, as suggested by C-S Li et al., "Time-Driven Priority Flow Control for Real-Time Heterogeneous Internetworking," IEEE INFOCOM '96 (1996), is used to slot the link bandwidth in time. Other suitable ring emulation techniques are discussed in M. Baldi, et. al, "Adaptive Real Time Group Multicast," IEEE INFOCOM '97 (1997). For a time-driven priority technique, it is assumed that each ring has a unique identifier, $R_i$, and each node has a virtual identifier, VID, where the VID is the set of its virtual ring identifiers. For exanple, if a node, u, belongs to rings, $R_1$, $R_3$, $R_7$, then $VID(u)=\{R_1, R_{3,} R_7\}$.

Figure 5:
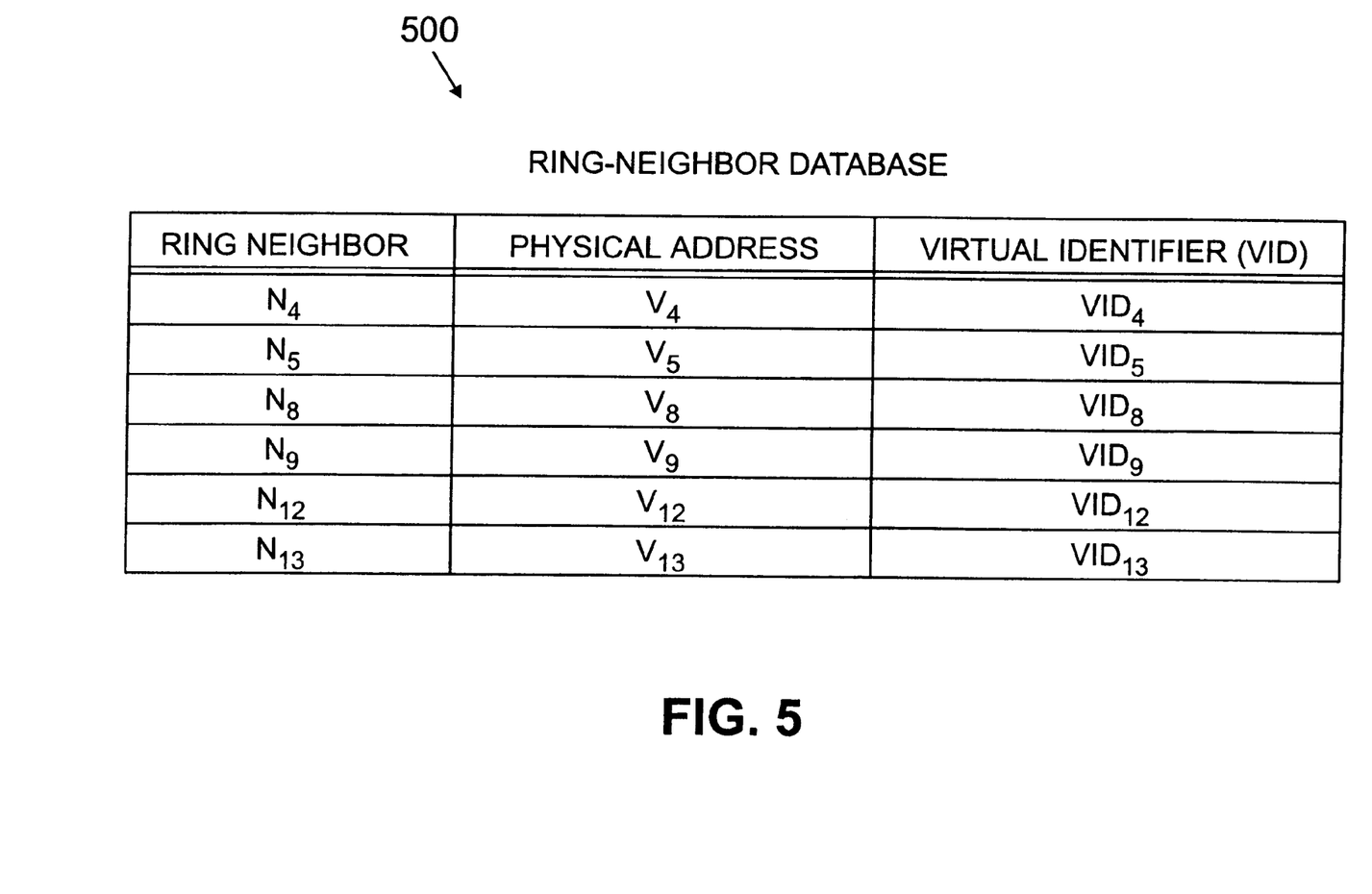
FIG. 5 is a table describing an exemplary ring-neighbor database of FIG. 4.

As previously indicated, each node 400-N includes a ring-neighbor database 500, shown in FIG. 5, that includes information about the ring-neighbors of a node on every ring that the node belongs to. As shown in FIG. 5, the ring-neighbor database 500 records the physical address v and the virtual identifier, VID, of each of its ring-neighbors on every ring the node belongs to. In addition, each node contains a network design structure database 440, indicating which nodes belong to each ring. Thus, when a source node sends a packet to a destination node, the physical address of the destination node can be obtained from the network design structure database 440 and placed in the packet header. Using this information, each node, u, along the path between the source and destination node can perform a routing-table-check function for a given destination, v, to determine the virtual identifier of destination, v.

A packet, P(v), sent from a source node, u, to a destination node, v, is referred to as "local" if the $VID(u) \cap VID(v) \neq 0$. In other words, u and v are neighbors on some ring. Otherwise, packet P(v) is referred to as "remote." For each remote packet, P(v), originating at node u, u is able to select a ring, $R_i$, for packet, P(v), which contains the bridge node, x, guaranteed by the one-bridge property of the present invention. Namely, $R_i \in VID(u) \cap VID(x)$ and also $VID(x) \cap VID(v) \neq 0$. In addition, it is assumed that precise timing information is available to each node in the network, for example, using the global positioning system (GPS). The routing algorithm preferably identifies a packet as either local or remote. In addition, the routing algorithm identifies which ring, R, that a packet should be placed on.

In the illustrative embodiment, the network is completely symmetric. In particular, it is assumed that all of the rings have the same number of nodes, denoted by n, and all the nodes have the same degree, d. In other words, each node belongs to exactly d rings. It is noted that the GQ-based constructions described in FIG. 3 enjoy this symmetry. It is not necessary, however, that the networks be symmetric, as would be apparent to a person of ordinary skill in the art.

The network timing is based on a global referencing structure, such as a global positioning system (GPS). Thus, each node in the network 100 receives clock ticks from a GPS receiver and uses them to keep its internal clock synchronized. The time between two successive ticks is called a time slot (TS). A typical time slot (TS) duration is 125 microseconds, or 8 kilohertz. The time slots (TSs) are assumed to rotate clockwise around a ring at each clock tick, and the time interval between two consecutive ticks is long enough to insert or remove a packet. Each slot has a 1-bit status field marking the slot as being either "full" (carrying a packet), or "empty."

The time it takes for a slot to rotate all the way around the ring is referred to as D. The link data rate is referred to as C. The number of slots (packets) simultaneously on a ring is referred to as p. For packets of size, s, the link data rate obeys the following inequality:

$$C \geq \frac{ps}{D}$$

One of the nodes in each ring, such as the node with the lowest identification number, is assigned as the virtual ring bandwidth manager, or the manager node. The manager node is the origin of the ring, and the slots are numbered from 1 to p, according to the time that he origin "sees" them.

Access Control

Access control mechanisms ensure fairness among different nodes. Each node, u, is allowed to transmit up to a predefined quota of k packets on each ring, $R_i$, that the node, u, belongs to, during any cycle of duration, D. Thus, the quota, k, is defined as follows:

$$k = \frac{p}{n}.$$

This access control may be implemented by statically reserving k slots for each node on each ring the node belongs to, and allowing a node, u, to insert packets only to the designated slots. This approach is somewhat inflexible, and may introduce unnecessary delays, for example, when a node has a burst of k packets to send, and the node sees empty slots, yet these slots belong to some other node, $v \neq u$.

Thus, one more flexible variation utilizes quota counters. For each ring, $R_i$, that a node belongs to, a node, u, has a quota-counter. The quota-counter is replenished to k for each new cycle. The node, u, can send packets as long as the counter is positive, and the counter is decremented for every packet sent. The quota-counter can be replenished in a fair manner, with a bound on the access delay, by allowing a node u to use at most k slots in the window $W_t(u)$, where the window $W_t(u)=(a_1, \ldots, a_p)$ is a p-tuple containing the numbers of the slots that node u sees between time t and time t+D. Thus, $W_t(u)$ is a cyclic shift of $(1, \ldots p)$.

Figure 6:
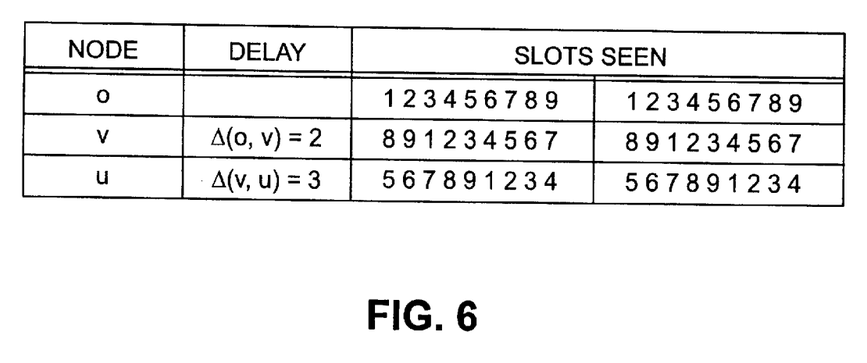
FIG. 6 is a table illustrating the slots of one ring, as seen by three hosts over 2 cycles, starting at a time t.

FIG. 6 illustrates the slots of one ring, as seen by three hosts over 2 cycles, starting at time t. Thus, $W_t(u)=(5,6,7,8,9,1,2,3,4)$. $\Delta(v, u)$ is the time difference between node v and u, such that a slot seen by node v at time t, is seen by u at time $t+\Delta(v, u)$. Then $W_{t+\Delta(v, u)}(u)$ and $W_t(u)$ equal $W_{t-\Delta(v, u)}(v)$. Thus, if node u has $k' \leq k$ packets to send at time t, then they can all be sent by time t+D. The k packets per cycle that a node is allowed to send contain both new packets (that the node needs to inject into the network) and bridged packets (that were originated by some other node and are already in the network). The access control mechanism is not sufficient (without flow control mechanisms, discussed below) to provide bandwidth or delay guarantees to the nodes.

The access control techniques discussed above can be maintained by a window-based access scheme, as modified herein. The window-based access scheme of the present invention is performed only at the sending nodes, without any explicit acknowledgements, unlike standard window-based access techniques.

Thus, as previously indicated, each node maintains an access control data structure 450 that contains a number of variables that prevent a node from transmitting more than a predefined number of packets on a particular ring, in a given time interval. Specifically, each node maintains the window size, ws(t), a ∂-list of timers, and the last-sent-time. The variable ws(t) is simply a counter indicating the number of slots that can be used by the node, u, at a time, t. Thus, the value of ws(t) varies between 0 and k over a cycle D. In other words, the variable ws(t) is an implementation of the k counter. Initially, ws(0) is set to k. After sending a packet, the window size counter for the next time slot, ws(t+1), is set to (ws(t)−1) (the value of ws(t) is decremented by 1), and a time stamp of t+D is assigned to the packet. The time stamps are organized into a ∂-list of timers, which is a linked list of integers indicating when the timer of the packet just sent will expire, with respect to the deadline of the previous packet sent. The head of the linked list contains the earliest deadline, which is decremented by one at each slot-tick. When the value becomes zero at time t', the list is shrunk and the current window is incremented (in other words, ws(t') ←ws(t'−1)+1). This technique allows a node to determine when a slot expires and can be reused. The variable ws(t) indicates how many slots the node can currently utilize. The ∂-list of timers keeps track of the future times at which a slot becomes available again.

Flow Control

Flow control techniques attempt to ensure that a network is congestion-free. Using the access control technique discussed above, packets are not dropped while they are on a single ring, so local traffic is congestion free. For remote traffic, the flow control technique needs to ensure that packets are not dropped because the buffers at a bridge node overflow. In accordance with the present invention, the one-bridge property ensures that a remote packet needs to cross only one bridge, so only a single buffer may overflow along the path of a packet. Furthermore, the bridge node shares a ring with the source node. Thus, feedback can be provided to all the sources on the ring, in the form of a circulating quota-matrix, $Q^i$, 470. The quota-matrix, $Q^i$, allows the source nodes to slow down transmissions when the bridge buffers are close to capacity.

As previously indicated, each node maintains a set of flow control buffers 460, consisting of a local queue, $LQ^i$, a remote queue, $RQ_{ij}(x)$, and a buffer queue, $BQ_{ij}$, and a flow control quota matrix $Q^i$ 470 to implement flow control. As previously indicated, the routing algorithm preferably identifies a packet as either local or remote and identifies which ring, R, that a packet should be placed on. Thereafter, the packet is placed by a node in the appropriate buffer.

Each node has a local queue, $LQ^i$, for host-to-ring local traffic. A node, u, has one local queue, $LQ^i$, for each ring that the node belongs to. In addition, each node has a remote queue, $RQ_{ij}(x)$, for host-to-ring remote traffic that is designated to ring $R_j$, via a bridge node, x. Thus, a node, u, has $(n-1)(d-1)$ remote queues, $RQ_{ij}$, for ring $R_i$, one for each remote ring, $R_j$, that can be bridged to via a neighbor node, x, and a total of $d(n-1)(d-1)$ such buffers for all the rings that the node, u, belongs to. It is noted that in the generalized quadrangle constructions, there is always a single node, x, bridging between rings $R_i$ and $R_j$. However, in general there may be several possible bridges. Both the local queue, $LQ^i$, and the remote queue, $RQ_{ij}(x)$, are unbounded.

In addition, each bridge node, u, also needs to bridge ring-to-ring traffic. Thus, each node has a buffer queue, $BQ_{ij}$, in which the node stores remote packets being bridged from rings $R_i$ and $R_j$. Thus, a node, u, has $(d-1)$ such buffer queues, $BQ_{ij}$, for every ring $R_i$ that the node belongs to, and thus $d(d-1)$ buffer queues, $BQ_{ij}$, in total. The buffer queues, $BQ_{ij}$, are bounded, with a size (in packets) denoted by MAXBQ. The flow control is congestion free, regardless of the value of MAXBQ.

As discussed further below, the flow control is implemented using a system of quotas that govern the service rates for the different queues. The quotas are in units of packets that a node can transmit during a cycle rotation time, D. Since local traffic does not pose a buffer overflow problem, a specific quota is not imposed on the local queue, LQ, buffer (other than the general access control quota, k). Thus, a node, u, is allowed to transmit at most $r_u^{ij}(x)$ packets per cycle out of buffer $RQ_{ij}(x)$.

The $r_u^{ij}(x)$ quotas are modified adaptively by the flow control algorithm 800 discussed below in conjunction with FIG. 8. Generally, as a buffer queue, $BQ_{ij}$, at some bridge node, x, is filled, the bridge node adaptively reduces the $r_u^{ij}(x)$ quotas of all the nodes, u, on a ring, $R_i$. For a discussion of policies guaranteeing fair queueing, see, for example, J. Nagle, On Packet Switches with Infinite Storage, ACM/IEEE Trans. on Networking, 35(4):435–438 (1987) or A. Demers et al., Analysis and Simulation of a Fair Queueing Algorithm, Proc. ACM SIGCOMM, 1–12 (1989), each incorporated herein by reference. In addition, for a discussion of buffer management issues, see, for example, Y. Afek et al., Space Efficient Fair Queueing by Stochastic Memory Multiplexing, Technical Report 322/97, Dept. of Computer Science, Tel-Aviv Univ. (1997), incorporated by reference herein.

For a node u that bridges between rings, $R_i$ and $R_j$, the total arrival rate to the bridge buffer queue, $BQ_{ij}$, in the current cycle must be controlled as a function of the BQ size at the end of the previous cycle. The total arrival rate at the buffer queue, $BQ_{ij}$, is closely related to the sum of remote quotas on the ring $R_i$, which is $$\sum_{x \in R_i} r_x^{ij}(u),$$

thus decreasing the $r^{ij}$ quotas should decrease the arrival rate at $BQ_{ij}$. However, the $r_x^{ij}(u)$ quotas are local variables at each node, x. Thus, in accordance with the present invention, the nodes are informed when quota adjustments are needed on some ring. In addition, the delay in propagating the updated quotas to the nodes on the ring must be accounted for.

Thus, according to another feature of the invention, a quota matrix $Q^i$, is circulated on each ring, $R_i$. Each node, u, advertises the total number of packets that it is willing to bridge from rings $R_i$ to $R_j$, in the entry $Q^i[u,R_j]$. If there is a unique bridge node on $R_i$ for every $R_j$ that can be bridged to, then $Q^I$ has $n(d-1)$ entries in total. The following flow control condition is utilized when the quota matrix returns to node u:

$$\sum_{x \in R_i} r_x^{ij}(u) \le Q^i[u, R_j]$$

When a node x receives the quota matrix, $Q^i$, on ring, $R_i$, x adjusts its remote quotas by setting:

$$r_x^{ij}(u) \leftarrow \left\lfloor \frac{Q^i[u, R_j]}{n-1} \right\rfloor$$

for all rings $R_j$ that can be bridged to from $R_i$. Node x needs to calculate the new advertisements for the number of packets that node x is willing to bridge from ring $R_i$ in the next cycle, update the appropriate entries in the quota matrix, $Q^i$, (namely the entries $Q^i[x,R_j]$ for all $R_j$ that x belongs to), and forward the $Q^i$ matrix.

A cycle for node u on ring $R_i$ starts when the node u transmits the quota matrix, $Q^i$, and ends when node u receives the quota matrix, $Q^i$, back. Thus, the cycles start at different times for different nodes. Therefore, when a node u advertises that it is willing to bridge B packets from $R_i$ to $R_j$ during the next cycle, this is with respect to cycles as perceived by node u. However, the quota, $r_x^{ij}(u)$, at node x on the same ring $R_i$ is applied to cycles as perceived by node x.

Figure 7:
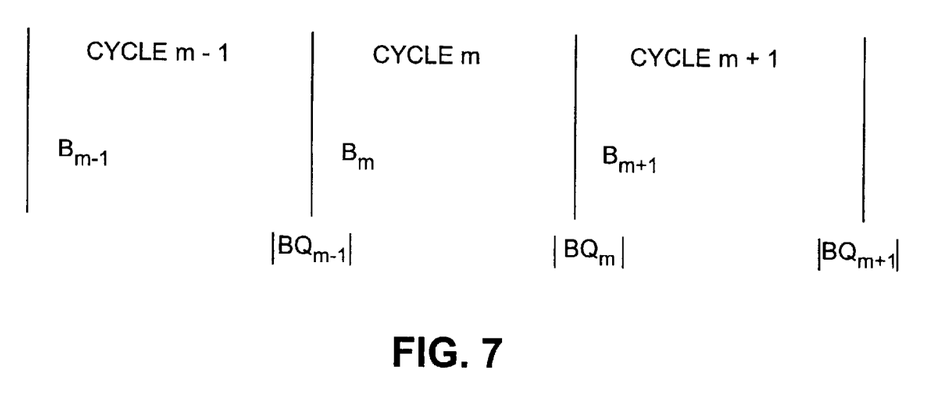
FIG. 7 illustrates the cycles, buffer queue, $BQ_{ij}$, and advertised capacities from the point of view of a bridge node, such as the node in FIG. 4.

FIG. 7 illustrates the cycles, buffer queue, $BQ_{ij}$, and advertised capacities from the point of view of the bridge node. For a particular buffer queue, $BQ_{ij}$, at a node u, $B_m$ denotes the number of packets that u advertises at the start of a cycle m (and places in the entry $Q^i[u, R_j]$). $|BQ_m|$ is the number of packets in the buffer queue, $BQ_{ij}$, at the end of cycle m. It is again noted that the maximal size of $|BQ_{ij}|$ is MAXBQ. The following rule is used to update the new advertisement:

$$B_{m+1} \leftarrow +\text{MAXBQ}-|BQ_m|B_m,$$

which is the difference between the current free space and the number of packets committed to at the start of the previous cycle.

Figure 8:
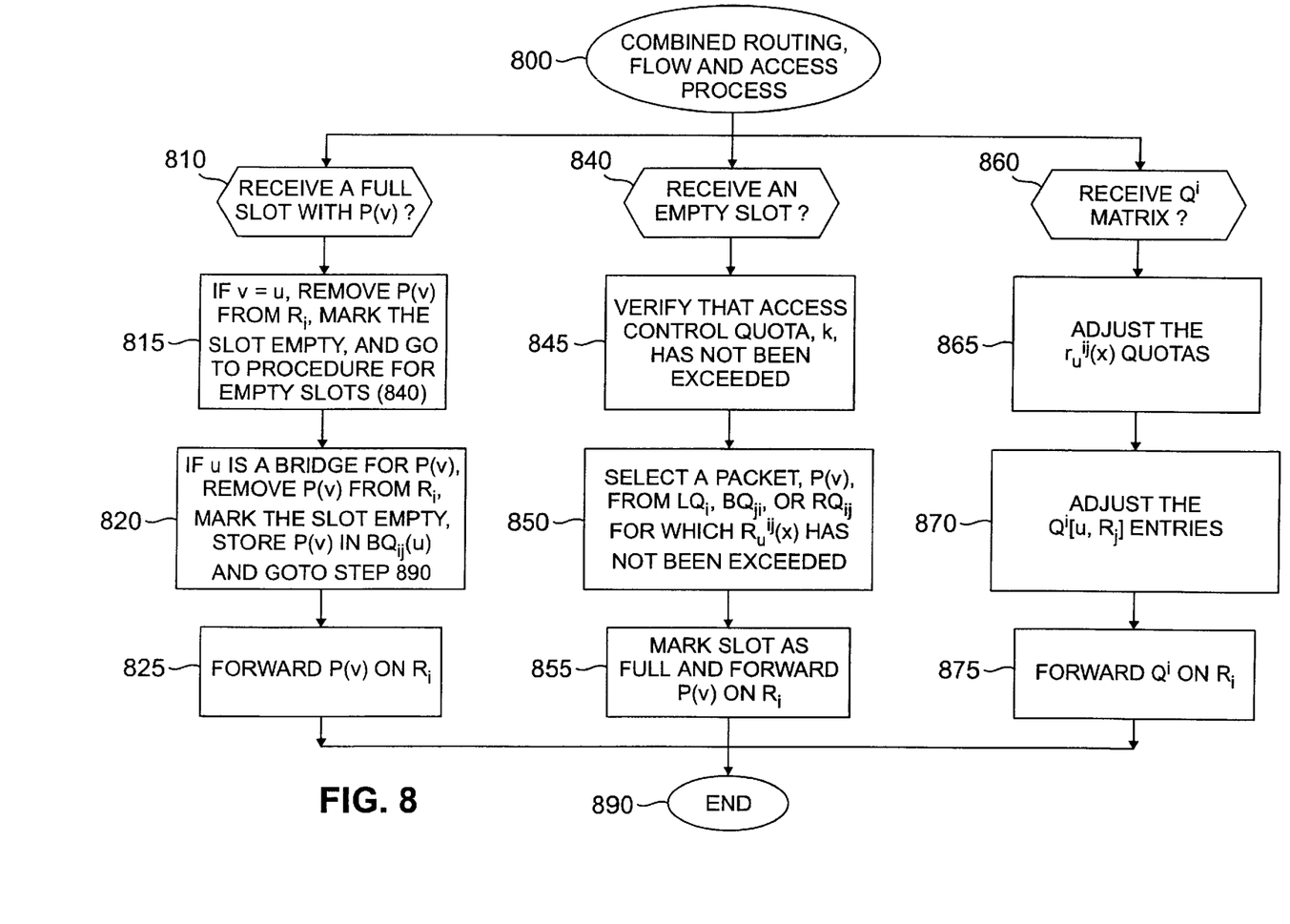
FIG. 8 is a flowchart describing an exemplary combined routing, flow and access control process as implemented by the node of FIG. 4.

As previously indicated, FIG. 8 illustrates a combined routing, flow and access control process 800, for a node u on a ring $R_i$, in the multi-ring network 100 that capitalizes on the combinatorial properties and implements the techniques discussed above in the ACCESS and FLOW CONTROL sections. As shown in FIG. 8, the combined routing, flow and access control process 800 is initiated for each slot in a cycle. A number of tests are performed during steps 810, 840 and 860 to determine how to process the slot.

If it is determined during step 810 that the slot is a full slot, containing a packet, P(v), then process control proceeds to a full slot procedure during steps 815, 820 and 825. If it is determined during step 815 that node u is the intended recipient of the packet, P(v), in other words, v=u, then the packet P(v) is removed from the ring, $R_i$, the slot is marked as empty, and process control proceeds to step 840, to implement the empty slot procedure. If it is determined during step 820 that u is a bridge node for the packet, P(v), then the packet is removed the ring, $R_i$, the slot is marked as empty, and the packet is stored in the buffer queue, $BQ_{ij}$, before program control terminates during step 890. Otherwise, the packet is forwarded on the ring, $R_i$, during step 825.

If, however, it is determined during step 840 that the slot is an empty slot, then process control proceeds to an empty slot procedure during steps 845, 850 and 855. During step 845, the node u verifies that the access control quota, k, has not been exceeded. Thereafter, the node u selects a packet, P(v), during step 850 from the local queue, $LQ^i$, the buffer queue, $BQ_{ij}$, or the remote queue, $RQ_{ij}(x)$, for which the quota $r_u^{ij}(x)$ has not been exceeded. The slot is marked as full during step 855 and the packet, P(v), is forward on the ring, $R_i$, before program control terminates during step 890.

If, however, it is determined during step 860 that the slot contains the quota matrix, $Q^i$, then process control proceeds to a matrix processing procedure during steps 865, 870 and 875. The quotas, $r_u^{ij}(x)$, are adjusted during step 865. The entries $Q^i[u, R_j]$ in the quota matrix, $Q^i$, are updated during step 870, and the quota matrix, $Q^i$, is forwarded on the ring, $R_i$, during step 875, before program control terminates during step 890.

Scaling GQ Designs to a Desired Size

In B. Yener at al., Combinatorial Design of Congestion-Free Networks, ACM/IEEE Transactions on Networking, 5(6):9890–1000 (December 1997), incorporated by reference herein, operations were introduced to scale projective planes to arbitrary sizes. According to a feature of the present invention, these operations are extended to scale generalized quadrangle (GQ) designs to any desired network size.

The insertion operation is defined between a base design (GQ) and a positive integer L. The insertion adds L nodes to the design by modifying its incidence matrix A. An insertion operation consists of (i) adding a new row to A; (ii) selecting an existing row, i, and (3) copying the $a_{ij}$ values of the row into the new row. Thus, the node that corresponds to row I of matrix A is cloned to form the new node being inserted. To insert L new nodes this procedure is repeated L times. Clearly, inserting nodes does not change the maximum node degree or the total number of rings. However, the rings do increase in size since a cloned node resides on all the rings its originator resided on. It is noted that there is a large degree of freedom in the choice of the row i to be copied in step (ii). This freedom can be used to minimize the maximal resultant ring size.

The multiplication operation is defined between a GQ design of N nodes and a positive integer, L. The result of the multiplication is a scaled design of LN nodes. In terms of the incidence matrix, A, the multiplication operation consists of repeating all the rows of the matrix, A, L times. In other words, each node in the design is cloned into L duplicate nodes which are inserted into the design.

The scaling operations identified above can be used by an algorithm to clone some nodes of a design to reach the desired network size. Generally, deciding which are the optimal nodes to clone so that the maximum ring size is minimized is a very difficult problem. Rather, two fast (sub-optimal) scaling algorithms are suggested.

First, the greedy approach disclosed in B. Yener at al., above, is suggested. This greedy approach inserts nodes one by one until the desired network size is obtained. In each insertion step, the algorithm clones a node which will result in the minimal increase in the maximal ring size. Alternatively, a randomized approach may be utilized. In this approach, the nodes to be cloned are selected uniformly at random. Many such randomly scaled designs are generated, and the best one among them is selected as the output.

It is to be understood that the embodiments and variations shown and described herein are merely illustrative of the principles of this invention and that various modifications may be implemented by those skilled in the art without departing from the scope and spirit of the invention.

We claim:

1. A method of transmitting a packet between a first node and a second node on a multi-ring network, where said first and second node are not neighbors, said multi-ring network based on a generalized quadrangle and satisfying the one-bridge property, said method comprising the steps of:

placing said packet on a ring that said first node belongs to;

identifying a single bridge node that (i) belongs to at least one ring including said first node and (ii) belongs to at least one ring containing said second node; and bridging said packet to said second node using said bridge node.

2. A method for processing a packet received by a first node from a ring of a multi-ring network, said packet destined for a second destination node, said multi-ring network including a plurality of nodes configured according to a generalized quadrangle and satisfying the one-bridge property, said method comprising the steps of:

establishing a remote buffer for storing packets destined for another node and a bridge buffer for storing packets for which said first node is a bridge node to another node, said remote buffer having a remote quota of said packets that said first node can transmit in a given time;

selecting a path to said destination based on the one-bridge property by passing said packet to another node on said ring, or storing said node in said bridge buffer if said first node is a bridge node to said second destination node;

forwarding packets from said remote buffer and said bridge buffer if said remote quota is not exceeded; and adjusting said remote quota if said bridge buffer exceeds a predefined threshold.

3. The method according to claim 2, further comprising the step of ensuring that local traffic on said ring is congestion free by establishing a packet quota.

4. The method according to claim 2, wherein said remote quota is obtained from a circulating quota matrix, $Q^i$.

5. The method according to claim 4, wherein each entry of said quota matrix, $Q^i$, indicates the total number of packets that a corresponding node is willing to bridge from rings $R_i$ to $R_j$.

6. The method according to claim 4, further comprising the step of slowing down transmissions on said ring when said quota matrix, $Q^i$, indicates that said bridge buffer is close to capacity.

7. The method according to claim 2, wherein said node can transmit at most $r_u^{ij}(x)$ packets per cycle out of each remote buffer, $RQ_{ij}(x)$.

8. The method according to claim 2, further comprising the step of adaptively reducing said remote quotas $r_u^{ij}(x)$ of all the other nodes on a ring as a buffer queue, $BQ_{ij}$, at some bridge node is filled.

9. The method according to claim 4, wherein a node adjusts its remote quotas after receiving said quota matrix, $Q^i$, on a ring, $R_i$, by setting:

$$r_x^{ij}(u) \leftarrow \left\lfloor \frac{Q^i[u, R_j]}{n-1} \right\rfloor$$

for all rings $R_j$ that can be bridged to from $R_i$.

10. A node in a ring of a multi-ring network, said node receiving a packet destined for a second destination node, said multi-ring network including a plurality of nodes configured according to a generalized quadrangle and satisfying the one-bridge property, said node comprsing:

a memory for storing computer readable code, a remote buffer for storing packets destined for another node and a bridge buffer for storing packts for which said first node is a bridge node to another node, said remote buffer having a remote quota of said packets that said first node can transmit in a given time;; and a processor operatively coupled to said memory, said processor configured to:

select a path to said destination based on the one-bridge property by passing said packet to another node on said ring, or storing said node in said bridge buffer if said first node is a bridge node to said second destination node;

forward packets from said remote buffer and said bridge buffer if said remote quota is not exceeded; and adjust said remote quota if said bridge buffer exceeds a predefined threshold.

11. The node according to claim 10, wherein said processor is further configured to ensure that local traffic on said ring is congestion free by establishing a packet quota.

12. The node according to claim 10, wherein said remote quota is obtained from a circulating quota matrix, $Q^i$.

13. The node according to claim 12, wherein each entry of said quota matrix, $Q^i$, indicates the total number of packets that a corresponding node is willing to bridge from rings $R_i$ to $R_j$.

14. The node according to claim 12, wherein said processor is further configured to slow down transmissions on said ring when said quota matrix, $Q^i$, indicates that said bridge buffer is close to capacity.

15. The node according to claim 10, wherein said node can transmit at most $r_u^{ij}(x)$ packets per cycle out of each remote buffer, $RQ_{ij}(x)$.

16. The node according to claim 10, wherein said processor is further configured to adaptively reduce said remote quotas $r_u^{ij}(x)$ of all the other nodes on a ring as a buffer queue, $BQ_{ij}$, at some bridge node is filled.

17. The node according to claim 12, wherein a node adjusts its remote quotas after receiving said quota matrix, $Q^i$, on a ring, $R_i$, by setting:

$$r_x^{ij}(u) \leftarrow \left\lfloor \frac{Q^i[u, R_j]}{n-1} \right\rfloor$$

for all rings $R_j$ that can be bridged to from $R_i$.

* * * * *